United States Patent
Li et al.

(10) Patent No.: US 8,943,808 B2
(45) Date of Patent: Feb. 3, 2015

(54) REDUCTANT DOSING SYSTEM

(75) Inventors: Yongxiang Li, Peoria, IL (US); Jinhui Sun, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 806 days.

(21) Appl. No.: 12/891,191

(22) Filed: Sep. 27, 2010

(65) Prior Publication Data

US 2012/0073264 A1 Mar. 29, 2012

(51) Int. Cl.
*F01N 3/24* (2006.01)
*F01N 3/20* (2006.01)
*F02B 37/00* (2006.01)

(52) U.S. Cl.
CPC ......... *F01N 3/208* (2013.01); *F01N 2610/1406* (2013.01); *F01N 2610/1473* (2013.01); *F01N 2610/146* (2013.01); *Y02T 10/24* (2013.01); *F01N 2610/1453* (2013.01); *F02B 37/00* (2013.01); *F01N 2610/10* (2013.01); *F01N 2610/02* (2013.01)
USPC ............................................. 60/295; 60/301

(58) Field of Classification Search
USPC .................................... 60/286, 295, 301, 303
See application file for complete search history.

(56) References Cited

U.S. PATENT DOCUMENTS

| | | | |
|---|---|---|---|
| 3,779,014 A | 12/1973 | Nohira et al. | |
| 5,047,220 A | 9/1991 | Polcer | |
| 5,369,956 A | 12/1994 | Daudel et al. | |
| 5,783,160 A | 7/1998 | Kinugasa et al. | |
| 6,063,350 A | 5/2000 | Tarabulski et al. | |
| 6,125,629 A | 10/2000 | Patchett | |
| 6,361,754 B1 | 3/2002 | Peter-Hoblyn et al. | |
| 6,455,009 B1 | 9/2002 | Kato et al. | |
| 6,696,031 B1 | 2/2004 | Twigg et al. | |
| 6,871,490 B2 | 3/2005 | Liang et al. | |
| 6,882,929 B2 | 4/2005 | Liang et al. | |
| 6,898,929 B2 | 5/2005 | Asmus et al. | |
| 6,928,806 B2 | 8/2005 | Tennison et al. | |
| 6,993,900 B2 | 2/2006 | Upadhyay et al. | |
| 6,996,975 B2 | 2/2006 | Radhamohan et al. | |
| 7,055,313 B2 | 6/2006 | Russell | |
| 7,062,905 B2 | 6/2006 | Khair et al. | |
| 7,134,273 B2 | 11/2006 | Mazur et al. | |
| 7,168,243 B2 | 1/2007 | Endicott et al. | |
| 2005/0252201 A1* | 11/2005 | Lecea et al. ..................... | 60/286 |
| 2006/0248876 A1 | 11/2006 | Taxon | |
| 2007/0175203 A1 | 8/2007 | Roozenboom | |
| 2008/0022657 A1 | 1/2008 | Pierpont et al. | |
| 2008/0087254 A1* | 4/2008 | Tanaka ........................ | 123/472 |
| 2008/0098726 A1 | 5/2008 | Donaldson et al. | |

(Continued)

FOREIGN PATENT DOCUMENTS

EP 2199556 6/2010
WO WO 98/28070 7/1998

(Continued)

*Primary Examiner* — Kenneth Bomberg
*Assistant Examiner* — Jonathan Matthias
(74) *Attorney, Agent, or Firm* — Finnegan, Henderson, Farabow, Garrett & Dunner LLP

(57) ABSTRACT

A reductant dosing system for an engine is disclosed. The reductant dosing system may have a supply of reductant, a reservoir configured to hold pressurized reductant, and a pump configured to draw reductant from the supply and discharge reductant at an elevated pressure into the reservoir. The reductant dosing system may also have a plurality of injectors fluidly connected to the reservoir, and a drain valve fluidly connected between the reservoir and the supply.

15 Claims, 2 Drawing Sheets

(56) References Cited

U.S. PATENT DOCUMENTS

| | | | |
|---|---|---|---|
| 2008/0148716 A1* | 6/2008 | Nishibu et al. | 60/295 |
| 2008/0202097 A1 | 8/2008 | Driscoll et al. | |
| 2009/0050109 A1* | 2/2009 | Hoffmann et al. | 123/447 |
| 2009/0266059 A1 | 10/2009 | Kesse et al. | |
| 2010/0071349 A1* | 3/2010 | Kitazawa | 60/277 |
| 2010/0139260 A1 | 6/2010 | Rodman et al. | |
| 2011/0139130 A1* | 6/2011 | Siddiqui | 123/520 |

FOREIGN PATENT DOCUMENTS

| | | | | |
|---|---|---|---|---|
| WO | 2004025108 | | 3/2004 | |
| WO | WO2008102719 | * | 8/2008 | B01D 53/86 |
| WO | 2010034401 | | 4/2010 | |

* cited by examiner

REDUCTANT DOSING SYSTEM

TECHNICAL FIELD

The present disclosure is directed to a dosing system, and more particularly, to a reductant dosing system for use with an internal combustion engine.

BACKGROUND

Internal combustion engines, including diesel engines, gasoline engines, gaseous fuel-powered engines, and other engines known in the art exhaust a complex mixture of air pollutants. These air pollutants are composed of gaseous compounds including, among other things, the oxides of nitrogen ($NO_X$). Due to increased awareness of the environment, exhaust emission standards have become more stringent, and the amount of $NO_X$ emitted to the atmosphere by an engine may be regulated depending on the type of engine, size of engine, and/or class of engine.

In order to comply with the regulation of $NO_X$, some engine manufacturers have implemented a strategy called selective catalytic reduction (SCR). SCR is an exhaust treatment process where a reductant, most commonly urea (($NH_2)_2CO$) or a water/urea solution, is selectively injected into the exhaust gas stream of an engine and adsorbed onto a downstream substrate. The injected urea solution decomposes into ammonia ($NH_3$), which reacts with $NO_X$ in the exhaust gas to form water ($H_2O$) and diatomic nitrogen ($N_2$). In order for SCR to be most effective, the reductant should be injected into the exhaust gas stream in a uniformly distributed manner.

An exemplary reductant dosing system is disclosed in U.S. Patent Publication Number 2010/1039260 of Rodman et al. that published on Jun. 10, 2010 (the '260 publication). Specifically, the '260 publication discloses a fluid delivery system for supplying fluid to an exhaust stream of a power source. The fluid delivery system includes a supply manifold and a plurality of supply exit orifices fluidly linked to the supply manifold. The exit orifices are arranged in an annular configuration around the exhaust stream to allow the fluid to flow from the manifold to the exhaust stream in a uniformly distributed manner.

SUMMARY

In accordance with one aspect, the present disclosure is directed toward a reductant dosing system. The reductant dosing system may include a supply of reductant, a reservoir configured to hold pressurized reductant, and a pump configured to draw reductant from the supply and discharge reductant at an elevated pressure into the reservoir. The reductant dosing system may also include a plurality of injectors fluidly connected to the reservoir, and a drain valve fluidly connected between the reservoir and the supply.

According to another aspect, the present disclosure is directed toward another reductant dosing system. This reductant dosing system may include a supply of reductant, a reservoir configured to hold pressurized reductant, and a pump configured to draw reductant from the supply and discharge reductant at an elevated pressure into the reservoir. The reductant dosing system may also include a plurality of injectors fluidly connected to the reservoir, and a controller in communication with the plurality of injectors. The controller may be configured to activate the injectors to inject pressurized reductant when a pressure of reductant within the reservoir is a desired pressure.

According to still another aspect, the present disclosure is directed toward a method of dosing reductant. The method may include drawing reductant from a low-pressure supply, pressurizing reductant, storing pressurized reductant, and simultaneously injecting stored reductant at a plurality of locations. The method may further include selectively draining stored reductant in response to one of a reductant pressure and an engine operational status.

DETAILED DESCRIPTION

Figure 1:
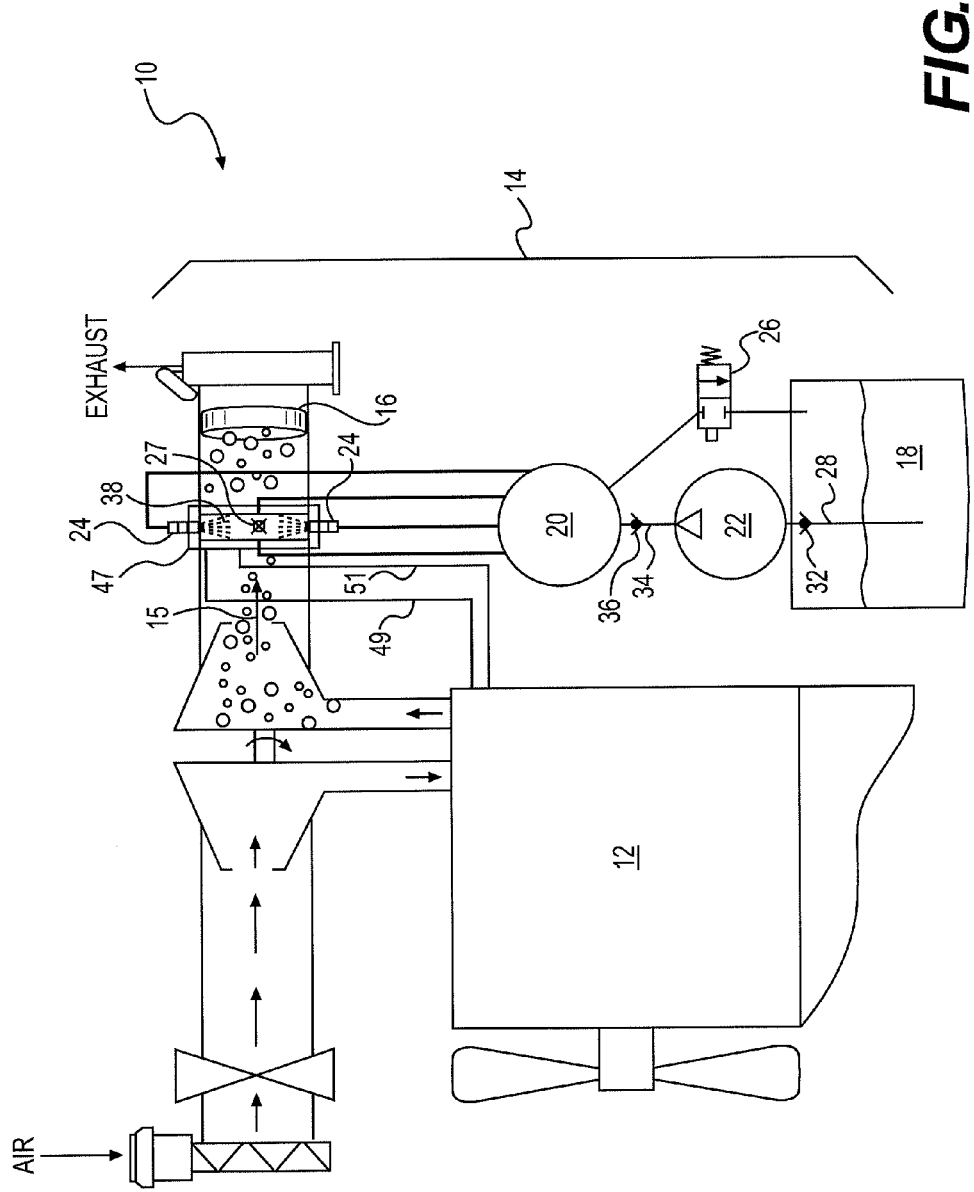
FIG. 1 is a schematic illustration of an exemplary disclosed power system.

FIG. 1 illustrates an exemplary power system 10 having an engine 12 and a reductant dosing system 14. Engine 12 may be an internal combustion engine operable to combust fuel and produce a mechanical power output and a flow of exhaust 15. The exhaust 15 from engine 12 may be directed through an aftertreatment component 16 to the atmosphere. In one example, aftertreatment component 16 may be a reduction catalyst configured to reduce a constituent of the exhaust 15 in the presence of a reductant to an acceptable level before discharge of the exhaust 15 to the atmosphere. It is contemplated, however, that aftertreatment component 16 may also or alternatively embody an oxidation catalyst, a particulate filter, or another aftertreatment component known in the art. Reductant dosing system 14 may be configured to supply the reductant utilized for the reduction process occurring within aftertreatment component 16.

Figure 2:
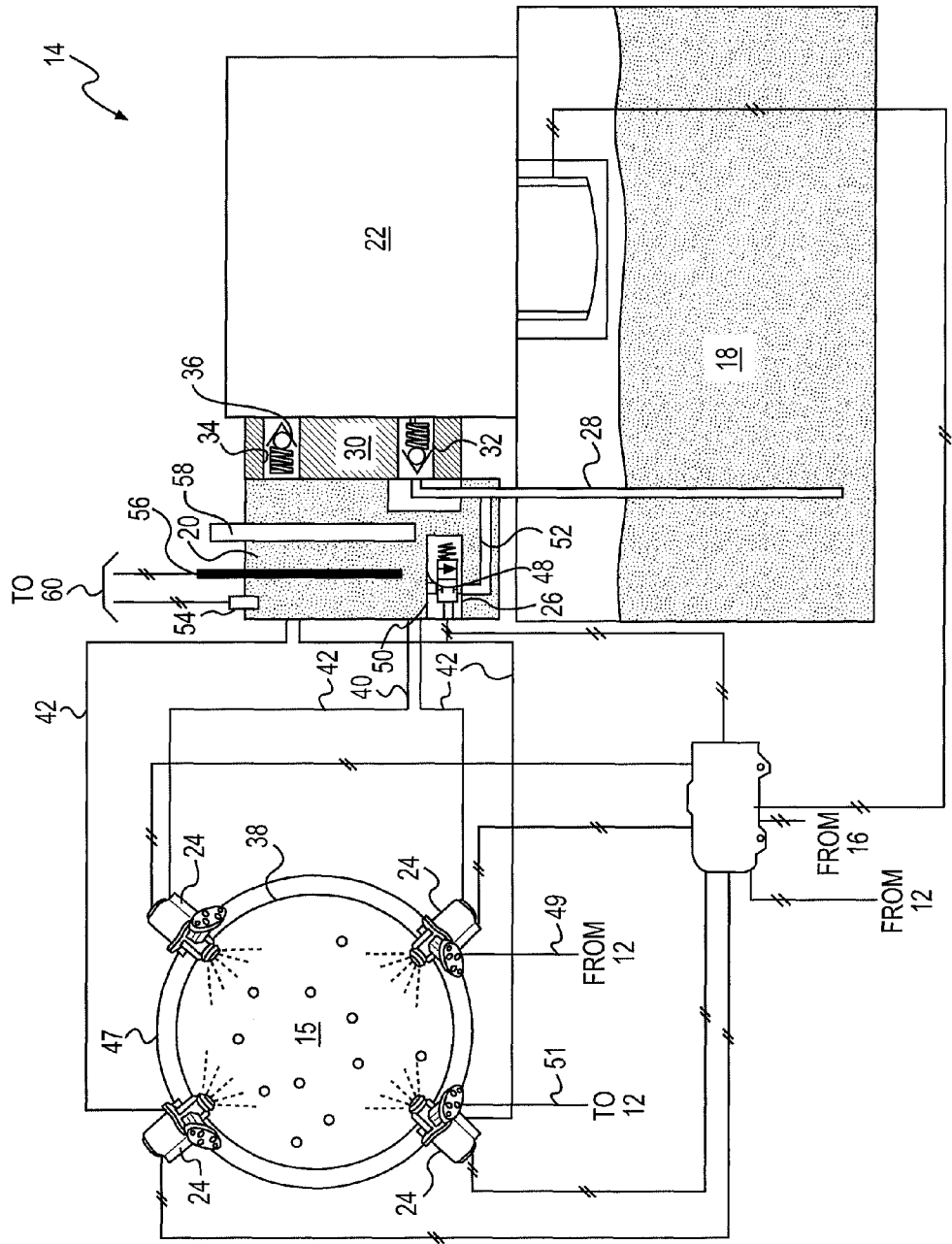
FIG. 2 is a pictorial illustration of an exemplary disclosed reductant dosing system that may be used with the power system of FIG. 1.

Reductant dosing system 14 may be configured to spray or otherwise advance reductant into the engine's exhaust 15 upstream of aftertreatment component 16 to affect a reducing chemical reaction. In one embodiment, reductant dosing system 14 may inject an urea solution into the exhaust 15 of engine 12 to affect selective catalytic reduction (SCR). The urea solution may include water ($H_2O$) and urea (($NH_2)_2CO$). At temperatures higher than about 180° C., the urea solution may decompose into ammonia ($NH_3$) that is used to convert $NO_x$ (NO and $NO_2$) in the exhaust flow 15 of engine 12 to diatomic nitrogen ($N_2$) and water ($H_2O$). As shown in FIG. 2, reductant dosing system 14 may include a supply of reductant 18, a reservoir 20 configured to hold pressurized reductant, a pump 22 configured to draw reductant from supply 18 and discharge reductant at an elevated pressure into reservoir 20, a plurality of injectors 24 fluidly connected to reservoir 20, and a drain valve 26 fluidly connected between reservoir 20 and supply 18.

Supply 18 may embody a low-pressure tank that is configured to hold reductant and fluidly connected via a supply passage 28 to a head member 30 of pump 22. One or more check valves 32 may be disposed within supply passage 28 at head member 30 to help ensure a unidirectional flow of reductant from supply 18 into pump 22. In the disclosed embodiment, supply 18 may be located gravitationally lower than pump 22 to facilitate gravity draining of supply passage 28, although other arrangements are also contemplated. In some applications, supply 18 may also be connected to and periodically replenished by one or more remote tanks (not shown) having a larger capacity.

Reservoir 20 may embody an enclosed chamber mounted to and supported by pump 22 via head member 30. Reservoir 20 may be configured to store a small quantity (e.g., an amount less than contained by supply 18) of reductant that has been pressurized by pump 22. In one embodiment, the reservoir 20 include an elastomeric liner or barrier that allows the volume thereof to expand to about ten times a combined maximum injection amount of all injectors 24 during a single dosing event. This expanding volume may help to dampen pressure pulsations caused by pumping and injecting actions. It is contemplated that an external pulsation dampener may additionally or alternatively be connected to reservoir 20 and/or that other volumes may also be utilized, if desired. A passage 34 within head member 30 may fluidly connect reservoir 20 to pump 22, and a check valve 36 may be disposed within passage 34 to help ensure a unidirectional flow of pressurized reductant from pump 22 to reservoir 20.

Pump 22 may be a metering pump such as, for example, a diaphragm pump, a centrifuge pump, a piston pump, or a rotary pump. Pump 22 may be electrically operated to draw low-pressure reductant from supply 18, and to pressurize the reductant to a desired level. Reductant pressurized by pump 22 may be directed past check valve 36 and through passage 34 into reservoir 20. In one embodiment, pump 22 may be mounted to and supported by an upper portion of supply 18. It is contemplated, however, that pump 22 may be mounted separately and/or remotely from supply 18, if desired.

Injectors 24 may be generally located upstream of aftertreatment component 16 (referring to FIG. 1) and configured to independently inject reductant into the exhaust 15 flowing through aftertreatment component 16. In the example of FIGS. 1 and 2, reductant dosing system 14 includes four separate injectors 24, although any number of injectors 24 may be included. The four injectors 24 of the disclosed embodiment may be disposed within an annular mounting member 38, for example an exhaust duct or manifold of engine 12, and distributed around the flow of exhaust 15 from engine 12. In one embodiment, the four injectors 24 may be spaced about 90° apart. For example, a first injector 24 may be disposed between the one and two o'clock positions, a second injector 24 may be disposed between the four and five o'clock positions, a third injector 24 may be disposed between the seven and eight o'clock positions, and a fourth injector 24 may be disposed between the ten and eleven o'clock positions. Although other radial distributions of injectors 24 are considered, it should be noted that, in some applications, it may be desirable to avoid injectors 24 being mounted at the six o'clock position and pointing upwards, in order to reduce the likelihood of reductant pooling and clogging in the vicinity of the injectors 24. It is contemplated that injectors 24 may also be skewed relative to each other along the longitudinal axis of the exhaust flow 15, if desired, and/or be oriented with or against the flow of exhaust 15.

Each injector 24 may embody an electronically operated spray nozzle that includes a valve element (not shown) movable from a closed or flow-blocking position at which no reductant passes into the exhaust flow 15, toward an open or flow-passing position at which a maximum injection of reductant is achieved. The valve element of each injector 24 may be independently moved to any position between the first and second positions to thereby vary the flow of reductant into the exhaust 15 from engine 12. Based on a known pressure of the reductant and the valve opening position of each injector 24, the flow rate of reductant from each injector 24 may be precisely controlled. It is contemplated that injectors 24 may alternatively be dependently controlled by the same amount (i.e., controlled as a group), if desired. Injectors 24 may be independently connected to reservoir 20 via individual reductant lines 42.

Mounting member 38 and/or injectors 24 may require cooling in some applications to help inhibit reductant coking. Accordingly, in some applications, reductant dosing system 14 may be fluidly connected to receive a flow of coolant from engine 12. Specifically, a coolant jacket 47 may be provided that at least partially surrounds or otherwise transfers heat with mounting member 38 and/or injectors 24. Coolant jacket 47 may be connected to a coolant supply line 49 and a coolant drain line 51 of engine 12 such that coolant from engine 12 may be circulated through coolant jacket 47, mounting member 38, and/or injectors 24. It is contemplated that coolant jacket 47 may transfer heat away from injectors 24 indirectly via mounting member 38 and/or directly through intimate contact of coolant with injectors 24, as desired.

Drain valve 26 may be disposed within reservoir 20 and selectively energized to control draining of reservoir 20. Specifically, drain valve 26 may be disposed within a cavity 48 of reservoir 20 and include an upstream drain passage 50 and a downstream drain passage 52 connected to supply passage 28 that facilitate fluid communication between reservoir 20 and supply 18. Drain valve 26 may include a solenoid-actuated and spring-biased valve element that is movable between an open or flow-passing position and a closed or flow-blocking position based. When drain valve 26 is in the open position, reductant from reservoir 20 may pass through drain valve 26 to supply 18. When drain valve 26 is in the closed position (shown in FIG. 2), the flow of reductant through drain valve 26 may be inhibited. Drain valve 26, in the depicted embodiment, is spring-biased toward the open position.

One or more sensors and/or heaters may be associated with reductant dosing system 14 to provide indications as to the operation of reductant dosing system 14 or facilitate the operation thereof. For example, a pressure sensor 54 may be associated with reservoir 20 and configured to provide a signal indicative of a pressure of reductant therein. A temperature sensor 56 may also be associated with reservoir 20 and configured to provide a signal indicative of a temperature of reductant therein. A heater 58 may additionally be located within reservoir 20 and be selectively energized to raise a temperature of reductant passing through reductant dosing system 14 to help prevent freezing or facilitate thawing of the reductant. Other sensors and/or heaters (not shown) may similarly be associated with reductant pump 22 and/or supply 18, if desired.

A controller 60 may be in communication with pump 22, injectors 24, drain valve 26, sensors 54 and 56, heater 58, and other components of reductant dosing system 14 to regulate operation of reductant dosing system 14 in response to various input. Controller 60 may embody a single or multiple microprocessors, field programmable gate arrays (FPGAs), digital signal processors (DSPs), etc. that include a means for controlling an operation of reductant dosing system 14 in response to the signals received from sensors 54 and 56, from engine 12, from aftertreatment component 16, and/or from other sources. Numerous commercially available microprocessors can be configured to perform the functions of controller 60. It should be appreciated that controller 60 could readily embody a microprocessor separate from that controlling other non-dosing related power system functions, or that controller 60 could be integral with a general power system microprocessor and be capable of controlling numerous power system functions and modes of operation. If separate from the general power system microprocessor, controller 60 may communicate with the general power system microprocessor via datalinks or other methods. Various other known circuits may be associated with controller 60, including power supply circuitry, signal-conditioning circuitry, actuator driver circuitry (i.e., circuitry powering solenoids, motors, or piezo actuators), and communication circuitry.

Controller 60 may be in communication with pump 22 and injectors 24 to initiate dosing events. In particular, controller 60 may be configured to activate pump 22 to draw in reductant from supply 18, pressurize the reductant, and discharge the pressurized reductant at elevated pressures into reservoir 20 where the reductant is stored in anticipation of dosing by injectors 24. Controller 60 may then selectively activate one or all of injectors 24 to independently and simultaneously open and allow the pressurized reductant from reservoir 20 to spray into the exhaust flow 15 of engine 12 at a desired rate and/or with a desired force. It is contemplated that activation of pump 22 and/or injectors 24 may be selectively initiated based on a pressure and/or temperature of the reductant within reservoir 20, based on an operational status or condition of engine 12 and/or aftertreatment component 16, and/or based on other conditions known in the art.

Controller 60 may also be in communication with drain valve 26 to initiate draining events. Specifically, controller 60 may be configured to move drain valve 26 to the flow-passing position under at least four different conditions. In a first condition, when a signal from pressure sensor 54 indicates that a pressure of reductant within reservoir 20 is higher than desired, controller 60 may energize the solenoid of drain valve 26 to cause drain valve 26 to open and pass pressurized reductant back to supply 18, thereby relieving the pressure within reservoir 20. Controller 60 may hold drain valve 26 in the flow-passing position during the overpressure condition until a signal from pressure sensor 54 indicates that the pressure within reservoir 20 has been lowered to the desired pressure. In one embodiment, the desired pressure may be about 4-8 bar, with drain valve 26 opening at about 10-12 bar. In a second condition, when a signal from engine 12 indicates that engine 12 has been turned off, controller 60 may again energize the solenoid of drain valve 26 to move drain valve 26 to the flow-passing position, thereby allowing reductant within reservoir 20 to gravity-drain back to supply 18. Controller 60 may maintain drain valve 26 in this flow-passing position for a desired period of time corresponding with the emptying of reservoir 20, until a signal from pressure sensor 54 indicates a sufficiently low pressure within reservoir 20, or until another condition monitored by controller 60 has been satisfied. In a third condition, when engine 12 has first been turned on or, alternatively, in preparation for turning engine 12 on, controller 60 may energize the solenoid of drain valve 26 while simultaneously activating reductant pump 22 to prime reductant pump 22 and remove any trapped air in preparation for an injecting event. In this manner, no injections of reductant may be unnecessarily wasted during the priming of reductant pump 22. In a fourth condition, based on a signal from temperature sensor 56, controller 60 may energize the solenoid of drain valve 26 while simultaneously activating reductant pump 22 to recirculate reductant and thereby facilitate thawing of reductant.

INDUSTRIAL APPLICABILITY

The disclosed reductant dosing system 14 may be used in any power system application where reductant dosing is required. The disclosed reductant dosing system 14 may provide accurate and repeatable dosing events that result in desired quantities of reductant being well-distributed throughout the exhaust flow 15 entering aftertreatment component 16. Specifically, by utilizing electronically-controlled injectors 24 and providing these injectors 24 with a stored volume of reductant at precisely-controlled pressures, it may be easier to adjust dosing frequency and the dosing may be more accurate and repeatable. In addition, electronically-controlled injectors 24 may suffer less from injector-to-injector variability.

The ability to selectively drain the disclosed reductant dosing system 14 may help to prolong component life thereof. In particular, by draining reservoir 20 at engine shutoff, the likelihood of residual reductant causing clogging or freezing may be reduced. In addition, by draining reservoir 20 at engine startup as part of a pump-priming procedure, reductant pump 20 may be rid of air pockets or bubbles that can cause unreliable injections without having to waste injections to perform the priming. Further, selective draining of reservoir 20 based on pressure and temperature may help to control pressures within reservoir 20 and facilitate thawing.

Because reductant dosing system 14 may be an airless dosing system, it may be simple and have increased longevity. That is, because reductant draining and injections may be performed without the assistance of pressurized air, the components normally required for these purposes can be eliminated. The resulting system may have fewer components resulting a lower system cost. In addition, the reduction in moving parts may increase a durability of the system, resulting in increased longevity.

It will be apparent to those skilled in the art that various modifications and variations can be made to the disclosed reductant dosing system. Other embodiments will be apparent to those skilled in the art from consideration of the specification and practice of the disclosed reductant dosing system. It is intended that the specification and examples be considered as exemplary only, with a true scope being indicated by the following claims and their equivalents.

What is claimed is:

1. A reductant dosing system for an engine, comprising:
a supply of reductant;
a reservoir configured to hold pressurized reductant, the reservoir being an enclosed chamber;
a pump configured to draw reductant from the supply and discharge reductant at an elevated pressure into the reservoir, the reservoir being mounted to the pump and the pump being mounted to the supply;
two injectors fluidly connected to the reservoir and configured to independently inject pressurized reductant into exhaust from the engine upstream of an aftertreatment component;
an annular mounting member configured to hold the injectors at equally spaced intervals around an exhaust duct; and
a coolant jacket that surrounds and supplies engine coolant to the annular mounting member and the injectors; and
a controller in communication with the injectors and being configured to activate the injectors to inject pressurized reductant when a pressure of reductant within the reservoir is a desired pressure,
wherein the reservoir has an expandable volume.

2. The reductant dosing system of claim 1, wherein the reservoir has a volume expandable to ten times a combined maximum injection amount of the injectors during a single dosing event.

3. A reductant dosing system for an engine, comprising:
a supply of reductant;
a reservoir configured to hold pressurized reductant;
a pump configured to draw reductant from the supply and discharge reductant at an elevated pressure into the reservoir;

two injectors fluidly connected to the reservoir and configured to independently inject pressurized reductant into exhaust from the engine upstream of an aftertreatment component;

an annular mounting member configured to hold the injectors at equally spaced intervals around an exhaust duct; and a coolant jacket that surrounds and supplies engine coolant to the annular mounting member and the injectors; and a drain valve fluidly connected between the reservoir and the supply, wherein the drain valve is electronically controlled based on at least one of a sensed pressure of the reservoir, a temperature of reductant, and an engine operational status.

4. The reductant dosing system of claim 3, further including:

a first passage extending from the supply to the pump; and a second passage extending from the drain valve to the first passage.

5. The reductant dosing system of claim 4, wherein the drain valve is disposed within the reservoir.

6. The reductant dosing system of claim 3, wherein the reservoir has an expandable volume.

7. The reductant dosing system of claim 6, wherein the reservoir has a volume expandable to ten times a combined maximum injection amount of the injectors during a single dosing event.

8. The reductant dosing system of claim 3, wherein the injectors are electrically controlled.

9. The reductant dosing system of claim 3, further including a single valve disposed between the pump and the injectors, the single valve being a check valve.

10. The reductant dosing system of claim 9, further including a second check valve disposed between the pump and the supply.

11. The reductant dosing system of claim 3, further including a heater disposed within the reservoir.

12. The reductant dosing system of claim 3, further including:

a temperature sensor disposed within reservoir;

a pressure sensor disposed within the reservoir; and a controller in communication with the temperature sensor, the pressure sensor, the pump, and the injectors, the controller configured operate the pump and the injectors in response to input from the temperature and pressure sensors.

13. The reductant dosing system of claim 3, wherein the reservoir is mounted to the pump.

14. The reductant dosing system of claim 13, wherein the pump is mounted to the supply.

15. A method of dosing reductant into exhaust of an engine, comprising:

drawing reductant from a low-pressure supply;

pressurizing reductant;

storing pressurized reductant;

simultaneously injecting stored reductant at two locations into the exhaust;

cooling the reductant at the two locations of injection; and selectively draining stored reductant in response to one of a reductant pressure, a reductant temperature, and an engine operational status, wherein selectively draining includes selectively draining stored reductant when the engine has been turned off and when the engine has been turned on.

* * * * *

UNITED STATES PATENT AND TRADEMARK OFFICE
CERTIFICATE OF CORRECTION

| | | |
|---|---|---|
| PATENT NO. | : 8,943,808 B2 | Page 1 of 1 |
| APPLICATION NO. | : 12/891191 | |
| DATED | : February 3, 2015 | |
| INVENTOR(S) | : Li et al. | |

It is certified that error appears in the above-identified patent and that said Letters Patent is hereby corrected as shown below:

Claims

Column 7, Lines 6-7, in Claim 3, delete "duct; and" and insert -- duct; --.

Signed and Sealed this
Seventeenth Day of November, 2015

Michelle K. Lee
*Director of the United States Patent and Trademark Office*